Feb. 6, 1934.   C. S. BRAGG ET AL   1,945,515
VACUUM BRAKE SYSTEM FOR AUTOMOTIVE VEHICLES
Filed June 27, 1930    2 Sheets-Sheet 1

INVENTORS
Caleb S. Bragg
Victor W. Kliesrath
BY
Louis Prevost Whitaker
ATTORNEY

Feb. 6, 1934.  C. S. BRAGG ET AL  1,945,515
VACUUM BRAKE SYSTEM FOR AUTOMOTIVE VEHICLES
Filed June 27, 1930  2 Sheets-Sheet 2
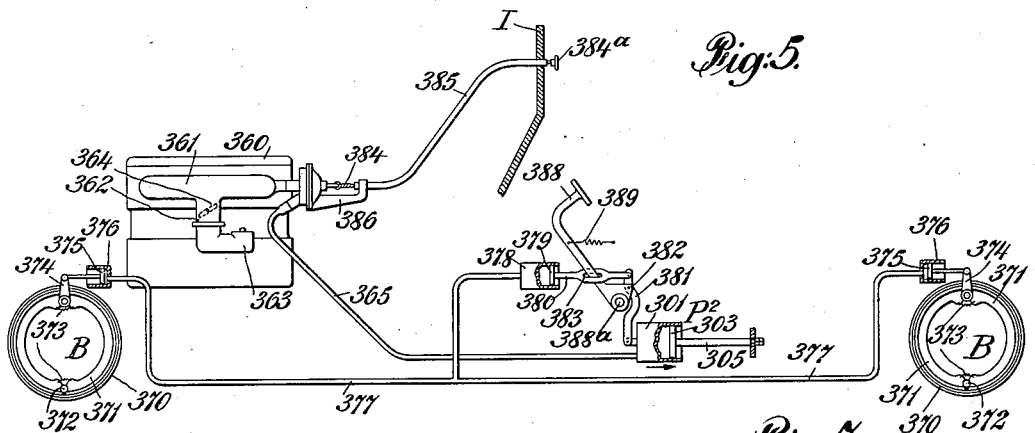
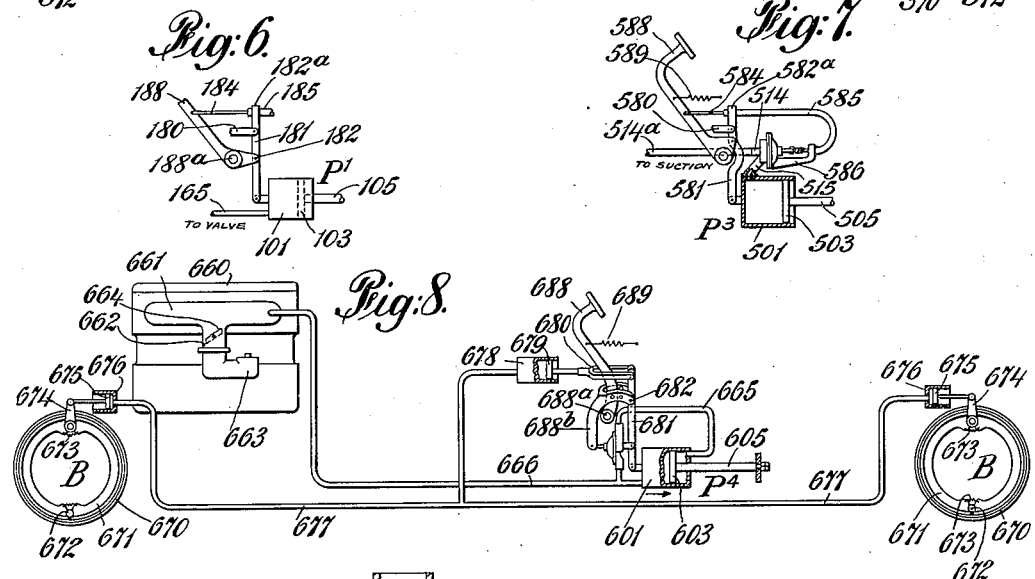
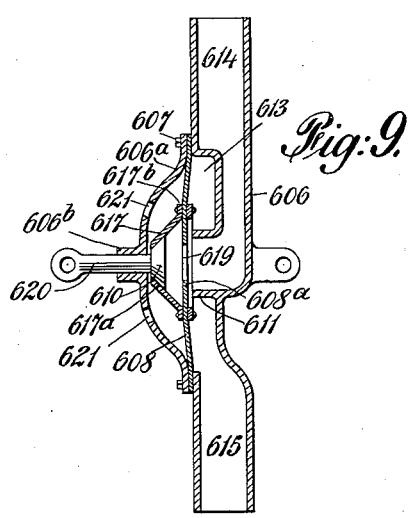

Patented Feb. 6, 1934

1,945,515

UNITED STATES PATENT OFFICE 1,945,515

VACUUM BRAKE SYSTEM FOR AUTOMOTIVE VEHICLES

Caleb S. Bragg, Palm Beach, Fla., and Victor W. Kliesrath, Port Washington, N. Y., assignors to Bragg-Kliesrath Corporation, Long Island City, N. Y., a corporation of New York Application June 27, 1930. Serial No. 464,176

3 Claims. (Cl. 303—54)

Our invention consists in the novel features hereinafter described, reference being had to the accompanying drawings which show several embodiments of the invention selected by us for purposes of illustration, and the said invention is fully disclosed in the following description and claims.

Our invention relates to brake systems for automotive vehicles in which a power actuator operated by differentials of fluid pressures is employed for operating the brake mechanisms under the control of suitable valve mechanism, and it is especially applicable to vacuum brake systems for automotive vehicles in which the differentials of fluid pressures are obtained by using atmospheric pressure and suction or partial vacuum conveniently obtained by a connection with the suction passage of the internal combustion engine used in propelling the vehicle, between the usual throttle valve, when in closed or partially closed position, and the engine cylinders, as the lower fluid pressure.

In carrying our invention into effect, we employ a controlling valve mechanism of novel and extremely cheap and simple construction, which may be employed in a variety of ways and uses to control power actuators of the pressure-balanced type and also power actuators of the vacuum-balanced type. The valve mechanism comprises parts which, during the power stroke of the actuator, are subjected to differentials of fluid pressure corresponding with those in the actuator effective as a reactionary force exerted in a direction to resist the movement of an operator operated part, to continue the power stroke of the actuator, or hold the movable part or parts thereof in a position intermediate of the power stroke thereof. The valve mechanism may be actuated by a physically operable part wholly unconnected with the brake mechanism, or it may be actuated by a physically operable part having a connection with the brake mechanism and with the power actuator, and in either case a "follow-up" action of the valve mechanism may be secured to permit the brakes to be gradually applied and held as applied in any position within the range of the power actuator, and additional power may, if desired, be applied to the brake mechanisms by the physical force of the operator after the power of the actuator has been fully exerted.

Our invention also comprises certain novel features of construction and combination of parts hereinafter fully disclosed and particularly pointed out in the claims.

Referring to the accompanying drawings which illustrate several embodiments of our invention selected by us for purposes of illustration, Fig. 1 is a diagrammatic view of a hydraulic brake system for automotive vehicles embodying our invention and including a pressure-balanced power actuator and controlling valve mechanism therefor.

Fig. 5 is a diagram similar to Fig. 1 showing the controlling valve mechanism for the actuator adapted to be controlled from the dash or instrument board.

Fig. 6 is a detail view of parts of the apparatus shown in Fig. 1, illustrating a slight modification thereof.

Fig. 7 is a similar view showing a further modification in which the valve mechanism is mounted on the cylinder of the power actuator.

Fig. 8 is a diagram similar to Figs. 1 and 5, showing a further modified arrangement in which the valve mechanism is installed between an extension of the pedal lever and a power applying lever pivotally connected therewith.

Fig. 9 is an enlarged detail sectional view of the form of valve mechanism illustrated in Fig. 8, showing another slight modification thereof.

Figure 1:
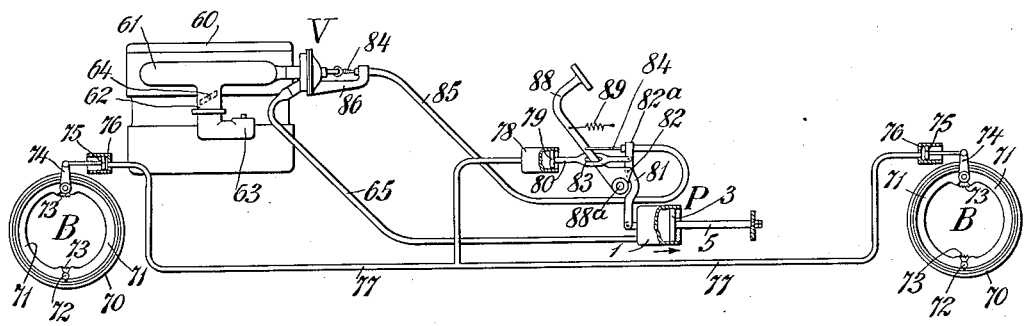

Referring to the diagram Fig. 1, it will be understood that it represents a typical brake system, in this instance a hydraulic brake system, for an automotive vehicle embodying our invention in which 60 represents the internal combustion engine for propelling the vehicle, having the suction passage comprising the intake manifold, 61, and the vertical passage, 62, leading from the carburetor, 63, said vertical passage being provided with the usual throttle valve, 64, indicated in dotted lines. B, B, represent brake mechanisms for the front and rear wheels, one of each of which is illustrated. The brake mechanisms may be of any desired type, but as shown they comprise the brake drum, 70, provided with interior brake shoes, 71, hinged together at 72, and having their upper ends engaging the usual expanding member, (not shown), which is operated by the brake applying lever, 74, the shoes being provided with the usual retracting springs, 73. In this instance the levers, 74, of the several brake mechanisms are connected with the pistons, 75, of hydraulic brake applying cylinders, 76, connected by suitable piping, 77, with a main hydraulic or pressure cylinder, 78, having a pressure piston, 79, connected by the rod or link, 80, in this instance with a power applying lever, 81, pivotally mounted at 82, on the usual brake pedal lever, 88, provided with the retracting spring, 89. The lower end of the power applying lever, 81, is connected with a movable member of a power actuator, indicated as a whole at P. In this instance the lever, 81, is shown pivotally connected to and supporting a cylinder, 1, of a power actuator of the pressure-balanced type, having a piston, 3, the piston rod, 5, of which is pivotally connected with a fixed portion of the chassis. The cylinder, 1, is closed at one end and open to the atmosphere at the other, so that the rear face of the piston is exposed at all times to atmospheric pressure, and as hereinafter explained, the closed end of the cylinder, 1, is connected by the valve mechanism, when in released position, with the atmosphere, so that the forward face of the piston is also exposed to atmospheric pressure. The piston is, therefore, submerged in air or pressure-balanced when in released position. The link rod, 80, is provided with a slot, 83, surrounding the pedal lever and providing a slight amount of lost motion between it and said lever. The spring, 89, normally holds the pedal lever in engagement with the rear end of said slot, 83, when the parts are in released position, and it will be obvious that when the pedal lever is depressed so as to take up the lost motion between it and the link rod, 80, the physical power of the operator can be exerted on the pressure piston, 79, and therethrough to the brake applying cylinders and pistons and the brake mechanisms connected with the latter.

Figure 2:
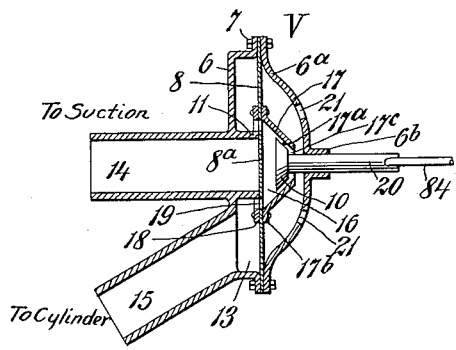
Fig. 2 is an enlarged sectional view of the valve mechanism illustrated in Fig. 1.

The controlling valve mechanism for the actuator is represented as a whole at V, and is shown in detail in section in Fig. 2. The valve casing preferably comprises two members, 6 and 6a, which are conveniently made circular in cross-section, and have their marginal portions connected as by bolts or screws, 7, so as to clamp between them a flexible diaphragm valve, 8. The casing member, 6, is provided with an annular seat member, 11, adapted to be engaged by the central portion of the diaphragm and communicating with a tubular connection, 14. An annular passage, 13, surrounds the annular seat member, 11, and is connected with a second tubular connection, 15, which conveniently has its axis disposed at an angle to its connection, 14, to facilitate the installation of the valve mechanism. The face of the diaphragm, 8, opposite that which engages the annular seat, 11, is provided with an inlet valve chamber, 16, having a centrally located internal seat, indicated at 17a. This chamber, 16, can be conveniently formed by a stamping, 17, of sheet metal, provided with an annular flange portion, 17b, for engaging the diaphragm, and having a central aperture, 17c. This stamping may be conveniently secured to the diaphragm by rivets passing through the flange portion, 17b, and through the diaphragm and a ring, 18, on the opposite side thereof, as indicated in Fig. 2, and in this instance the seat portion, 17a, is conveniently formed by the walls of the stamping adjacent to the central aperture, 17c. The diaphragm, 8, is provided with a plurality of apertures, 19, exterior to the seat engaging portion, 8a, thereof, and connecting the chamber, 16, with the chamber, 13, in the casing member, 6. Within the chamber, 16, is located a valve, 10, having a valve stem, 20, extending through the aperture, 17c, without fully closing the same, and having a guiding engagement with a sleeve, 6b, on the casing member, 6a. The casing member, 6a, is also provided with apertures, 21, so that the outer face of the diaphragm, 8, and of the walls of the stamping, 17, connected therewith, are at all times subjected to atmospheric pressure, whether the valve, 10, is seated or not.

It is to be understood that this form of valve mechanism is capable of a very wide range of use, as will be hereinafter more particularly pointed out. The connections, 14 and 15, may be connected respectively, the one with a source of suction, i. e., the manifold, and the other with a power actuator between the piston and the closed end of the cylinder thereof, and in the alternate positions of the valve mechanism, to wit, with the diaphragm, 8, seated, and the valve, 10, unseated on the one hand, and with the valve, 10, seated and the diaphragm unseated on the other hand, the cylinder can be alternately connected with suction and with atmosphere, while if the diaphragm, 8, and valve, 10, are both seated simultaneously, the cylinder will be disconnected from both suction and atmosphere.

In the installation shown in Fig. 1, the connection, 14, is connected with suction, being in this instance directly connected with the intake manifold, 61, in any usual or preferred manner. The connection, 15, is connected by a pipe, 65, which may be in whole or in part a flexible hose, with the closed end of the cylinder, 1. In such case, when the valve is in the released position, as indicated in Fig. 1, with the diaphragm, 8, seated and the valve, 10, unseated, the cylinder, 1, will be disconnected from the manifold by the engagement of the portion, 8a, of the diaphragm with the annular seat member, 11, while the cylinder will be in communication with the atmosphere through the central aperture, 17c, of the stamping, 17, and ports, 19.

In the installation shown in Fig. 1, the valve mechanism is connected for operation with the pedal lever, 88, by means of a Bowden wire, 84, the casing, 85, of which has one end rigidly secured to a bracket, 86, in fixed relation to the valve casing, while the other end is rigidly connected with an extension, 82a of the power applying lever, 81.

The parts being in released position as shown in Figs. 1 and 2, and assuming that the engine is running and the throttle valve is closed, a partial vacuum represented by appoximately twenty inches of mercury on the vacuum gauge at sea level will exist in the intake manifold, 61, and in the tubular connection, 14, of the valve mechanism there will, therefore, exist a maximum differential of fluid pressures on the central chamber, 8a, of the diaphragm, which will be exerted in a direction to hold the diaphragm firmly seated on the seat member, 11. To effect an operation of the brake mechanism, the operator will depress the pedal lever, 88, thereby exerting a pull on the Bowden wire, 84, which will first seat the valve, 10, shutting off communication between the actuator cylinder and atmosphere, and will then unseat the diaphragm, 8, from the seat member, 11, and thus connect the actuator cylinder forward of the piston with the intake manifold. Air will be withdrawn from the closed end of the actuator piston, and as the piston is in this instance held from movement, the atmospheric pressure on the outer face of the closed end of the cylinder will cause the cylinder to move in the direction of the arrow, Fig. 1, carrying with it the lower end of the lever, 81, and transmitting the power of the actuator, which may be multiplied by the lever, 81, as shown, to the piston, 79, of the hydraulic pressure cylinder, and thus to the brake mechanism connected therewith. The brakes will be applied with increasing power as long as the forward movement of the pedal lever continues, and if the movement of the pedal lever is stopped at any point before power of the actuator is fully applied, the continuing movement of the actuator cylinder will cause a relative movement between the power applying lever and the pedal lever, and will effect a movement of the casing, 85, of the Bowden wire, with respect to the wire, 84, so as to partially release the valve stem, 20, sufficiently to permit the diaphragm to seat on the seat member, 11, thus closing off communication between the cylinder and the suction in the manifold, and arresting the stroke of the power actuator and holding the brakes as applied. This effects a mechanical "follow-up" and enables the brake mechanism to be applied proportionately to the extent of movement of the pedal lever. As soon as the pedal is depressed to produce a power stroke of the actuator, and during the entire power stroke thereof, it will be seen that the outer surface of the diaphragm and shell or stamping, 17, will be exposed to atmosphere, while the inner surface of the diaphragm will be exposed to suction. There will, therefore, be a differential of fluid pressures exerted on the valve parts corresponding with that in the actuator and exerted in a direction to seat the diaphragm. This differential of fluid pressures will be transmitted through the valve stem, 20, and the Bowden wire to the pedal lever in a direction to resist the forward movement of the pedal lever, and will be felt by the operator on the sole of his foot, so as to enable him to determine the extent to which the power of the actuator is applying the force to the brake mechanisms. The degree of reactionary force thus provided will depend upon the diameter of the diaphragm, 8, which is exposed to differentials of fluid pressures during the power stroke of the actuator. In some instances where it is not desired to unduly increase the diameter of the diaphragm and therefore of the valve casing, and additional reactive force on the pedal is required or desired, a certain amount of the power of the actuator may be diverted for this purpose. This may be conveniently effected by pivoting the power applying lever, 81, at a point on the pedal lever excentrically to the pivotal axis of the pedal lever, and in such relation thereto that, during the power stroke of the actuator to apply the brakes, a portion of the power of the actuator will be applied to the pedal lever through said pivotal connection between the levers, 81, and 88, to wit, at the point, 82, to exert a mechanical reaction on the pedal lever. Thus in Fig. 1 the lever, 81, is shown pivoted at 82, to the pedal lever at a point above the pivotal axis, 88ª, thereof, so that the pedal lever will be subjected to the reactionary force from the movable cylinder of the power actuator in addition to the reactionary force caused by the differential of fluid pressures on the valve part. The means for obtaining this mechanical reaction on the pedal lever, from the power actuator itself, is not claimed herein except in combination with the other features shown and described, as it forms the subject matter of another application for Letters Patent of the United States filed on the 14th day of March, 1928, and given Serial No. 261,462.

Where the differential of fluid pressures on the valve is sufficient to supply the desired amount of reactionary force and no material reaction from the power actuator is desired, the power applying lever may be connected with the pedal lever in substantial alignment with the pivotal axis of the pedal lever, so that any reaction from the power applying lever will be taken up directly by the pivotal connection of the pedal lever, as shown in Fig. 6 for example, in which the parts corresponding to those illustrated in Fig. 1 are given the same reference characters with the addition of 100 to avoid repetition.

When the brakes have been applied by the full power of the actuator, a further depression of the pedal lever, which will take up the lost motion between it and the forward end of the slot, 83 (Fig. 1), will enable the operator to add physical force to the brakes in addition to the force exerted by the actuator, and in like manner will permit the brakes to be applied by physical force alone in case the engine is not running, or in case the power should fail for any reason. The adjustment of the valve by means of the Bowden wire must be such that the stamping, 17, just clears the casing, 6a, when the depression of the pedal causes it to engage the end of the slot, 83.

Figure 3:
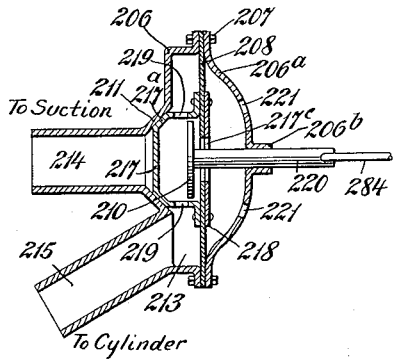
Fig. 3 is a similar view of a slightly modified form of the valve mechanism illustrated in Fig. 2.

In Fig. 3, in which the parts corresponding with those illustrated in Fig. 2 are given the same reference numerals with the addition of 200, we have illustrated a modified form of the valve, in which the diaphragm, 208, is provided with a central aperture, 217c, and carries on its rear face a shell or stamping, 217, forming within it the air inlet valve chamber provided with an annular valve seat, 217a, to engage an annular conical seat, 211, formed in this instance in the casing member, 206, the shell or stamping being provided with lateral apertures, 219, communicating with the chamber, 213, which in turn communicates with the connection, 215, ordinarily connected with a closed end of the pressure balanced actuator cylinder, while the connection, 214, leading to the valve seat, 211, is connected with suction. Within the shell or stamping, 217, is a disc valve, 210, carried by the valve stem, 220, and adapted to seat on the inner face of the diaphragm and close the aperture, 217c. In attaching the shell or stamping, 217, to the diaphragm, it is conveniently riveted therethrough and through a ring, 218, which in this instance is on the front face of the diaphragm and extends to the edges of the aperture, 217c, so as to form a support for the portions of the diaphragm surrounding this opening when the latter are engaged by the disc valve. The operation of this form of valve mechanism will be exactly the same as that previously described with reference to the form shown in Fig. 2.

Either of these valve mechanisms can also be used for controlling a power actuator of the vacuum balanced type, an example of which actuator is shown in Fig. 8. In this type of actuator the cylinder is closed at both ends, a portion of the cylinder forward of the piston is at all times connected with the intake manifold, and a portion of the cylinder in rear of the actuator is normally connected with the suction source through the valve mechanism, which admits air to the cylinder in rear of the piston to produce a power stroke and withdraw the admitted air, to release the piston and permit the brakes connected therewith to be released.

We desire to have it understood that the valve mechanism can be operated independently of the pedal lever, if this is found desirable. For example, in Fig. 5, in which the parts shown in Fig. 1 are given the same reference numerals with the addition of 300, we have shown an installation similar to that illustrated in Fig. 1, except that the Bowden wire, 384, extends to a button, 384a, on the dash or instrument board, indicated at I, the casing, 385, for the Bowden wire having one end secured to the bracket, 386, and the other end secured to the instrument board, I. In this case the brakes can be applied by power by simply pulling out the button, 384a, and Bowden wire, 384, to the desired extent, and during the power stroke the gradual increasing differential of fluid pressures on the movable valve parts would be transmitted to the hand of the operator, so as to advise him as to the extent to which the brakes are being applied by the actuator. The pedal lever need not be used, except to add further physical force to the brakes or to operate them by physical force if desired or in case of failure of power. In this case there would be no follow-up operation of the valve mechanism, and the operator, if he desired to apply the brakes gradually or to hold them as applied at an intermediate point in the stroke of the actuator, would accomplish this result by slightly relaxing his pull on the button, 384a.

Figure 4:
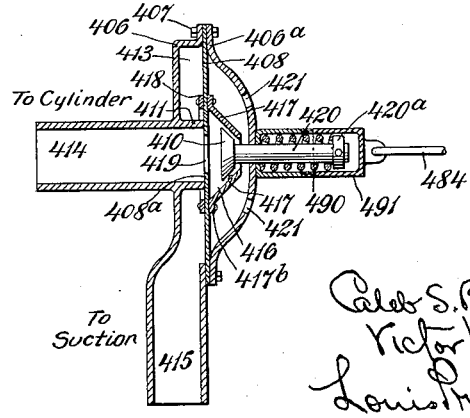
Fig. 4 is a similar sectional view of another modification of the valve mechanism.

In Fig. 4, in which the parts corresponding with those in Fig. 2, are given the same reference numerals with the addition of 400, we have illustrated a slightly modified form of valve, and a simple follow-up action, by interposing a spring, 490, between the valve stem, 420, and the Bowden wire, or other operative connection, to a physically operable part. In this form of the valve mechanism the diaphragm, 408, is provided with a central aperture, 419, within the annular seat engaging portion, 408a, communicating with the connection, 414, which in this instance leads to the closed end of a pressure balanced power actuator, while the connection, 415, leads to suction. The valve is otherwise constructed in substantially the same manner as shown in Fig. 2. In this instance the Bowden wire, 484, is connected to a separate casing, 491, containing the spring, 490, which is interposed between the inner end of the casing, 491, and the collar, 420a, on the valve stem. In the position of the parts illustrated in Fig. 4, the atmosphere will be connected with the cylinder in the released position of the valve mechanism, and a power stroke of the actuator can be inaugurated by pulling the casing, 491, away from the valve mechanism sufficiently to compress the spring, 490, to a greater or less extent, and at the same time seat the disc valve, 410, and unseat the diaphragm valve, 408, so as to connect the actuator cylinder with suction. In this form of the invention, as the differential of fluid pressures builds up on the movable valve parts, the reactionary effect will be exerted through the collar, 420a, on the spring, 490, and as soon as it becomes great enough to overcome the tension of the spring as adjusted and increased by the pulling out of the casing, 491, the diaphragm will seat itself on the seat member, 411, shutting off the connection between the actuator cylinder and suction, and holding the brakes as applied. If the spring casing, 491, is further drawn out to further compress the spring, 490, the diaphragm will again unseat and the brakes will be applied with increased force by the actuator. The spring, 490, therefore provides a "follow-up" operation in connection with the gradually increasing differential of fluid pressures on the movable valve parts, and this reactionary force is enabled to perform the two functions of apprising the operator of the extent to which the power actuator is applying force to the brakes, and also to automatically arrest the stroke of the actuator at any intermediate point, and thus permit the brakes to be gradually applied.

It will be understood that the operation of the valve mechanism will be effected by causing a relative movement between the movable valve parts and the valve casing, and it is immaterial how this relative movement is effected. In Figs. 1 and 5 for example, we have shown the valve casing stationarily supported by and directly connected with the intake manifold, but we wish it to be understood that the valve casing may be mounted upon any other stationary part, or it may be mounted upon a movable part and operated from a relatively movable part connected with the movable valve parts.

For example in Fig. 7, in which the parts corresponding with those shown in Fig. 1 are given the same numerals with the addition of 500, we have shown the valve mechanism of the form illustrated in Fig. 2, supported by and connected with the close end of the cylinder, 501, of the power actuator, the connection, 514, being connected by a suction pipe, 514a, with the intake manifold, and at least a portion of said pipe will of necessity be made flexible to accommodate the movements of the cylinder. The movable valve parts are in this instance connected with the pedal lever by the Bowden wire, 584, and Bowden housing, 585, connected with the bracket, 582a, of lever, 581, and with bracket, 586, fastened to the valve casing, and the operation will be the same as that previously described with reference to Fig. 1.

In Figs. 8 and 9, in which the parts corresponding with those shown in Figs. 1 and 2 are given the same reference numerals with the addition of 600, we have shown an installation in which the valve casing is connected with and supported by the power transmitting lever, 681, while the movable valve stem is connected to an extension, 688b, of the pedal lever, 688, the valve mechanism being operated by a pushing action instead of a pulling action and being slightly modified, as indicated in Fig. 9, to meet this situation. In this figure we have also the power actuator, P4, of the vacuum balanced type, in which the cylinder is closed at both ends, the forward end being connected at all times by the suction pipe, 666, with the intake manifold, 661, while the rear end is connected by the pipe, 665, with the connection, 614, of the valve casing member, 606, while the connection, 615, is connected with the suction pipe, 666. Otherwise the valve mechanism is substantially identical with that shown in and previously described with reference to Fig. 4.

In the released position of the valve mechanism illustrated in Fig. 9, the disc valve, 610, and the diaphragm, 608, is unseated by retracting spring, 689, so that both ends of the cylinder are connected with vacuum and the actuator is vacuum balanced. The depression of pedal lever 688 will first seat the diaphragm on the seat member, 611, to close off communication between the rear end of the actuator cylinder and suction, after which the valve, 610, will be open to connect the rear end of the cylinder with atmosphere, through the aperture, 619. In other respects the apparatus shown in Figs. 8 and 9 operates as described with reference to Figs. 1 and 2, and reaction will be provided by equalizing the differential of fluid pressures on the valve parts as the brakes are applied, and so increasing the load of spring, 589, which must be overcome by the force of the operator. Additional mechanical reaction may be provided if desired as previously described, by pivoting the power applying lever, 681, at 682, to a part connected with the pedal lever at a distance above the pivotal support, 688a, of the pedal lever.

This application is directed toward the specific valve device disclosed. The combination of elements comprising a complete brake system for automotive vehicles is claimed in my co-pending application Serial No. 702,460, filed December 15, 1933.

Obviously further variations in the construction of the valve mechanism and the installation thereof may be made without departing from our invention.

What we claim and desire to secure by Letters Patent is:—

1. In a controlling valve mechanism for vacuum operated power actuator, the combination with a valve casing provided with an annular seat member and having an annular chamber surrounding said seat, a tubular connection communicating with said seat, and a second tubular connection communicating with said annular chamber, and means for connecting said tubular connections respectively with a source of suction and with a vacuum operated device, of a flexible diaphragm having its marginal portions in sealing engagement with marginal portions of said casing, a hollow metallic air inlet valve chamber secured to and supported by said diaphragm, said diaphragm being provided with a valve portion to engage said annular seat member, an air inlet aperture, and means for establishing communication at all times between the interior of said valve chamber and one of said tubular connections, an air inlet valve in said valve chamber, and physically operable means connected with said air inlet valve, the movement of said valve into closed position being in a direction to unseat the diaphragm from said annular seat, whereby the differential of fluid pressures on opposite faces of the diaphragm and valve chamber, when the diaphragm is unseated, will react against said physically operable part in a direction to seat said diaphragm.

2. In a controlling valve mechanism for vacuum operated power actuators, the combination with a valve casing provided with an annular seat member and having an annular chamber surrounding said seat, a tubular connection communicating with said seat, and a second tubular connection communicating with said annular chamber, and means for connecting said tubular connections respectively with a source of suction and with a vacuum operated device, of a flexible diaphragm having its marginal portions in sealing engagement with marginal portions of said casing, a hollow metallic air inlet valve chamber secured to the diaphragm on its outer face and provided with an air inlet aperture, means for connecting the interior of said valve chamber at all times with one of said tubular connections, an air inlet valve in said valve chamber, and physically operable means connected with said air inlet valve, said valve being movable to closed position in a direction to unseat said diaphragm, whereby the differential of fluid pressures on opposite faces of said diaphragm and valve chamber, when the diaphragm is unseated, will react upon said physically operable part in a direction to seat said diaphragm.

3. In a controlling valve mechanism for vacuum operated power actuators, the combination with a valve casing provided with an annular seat member and having an annular chamber surrounding said seat, a tubular connection communicating with said seat, and a second tubular connection communicating with said annular chamber, and means for connecting said tubular connections respectively with a source of suction and with a vacuum operated device, of a flexible diaphragm having its marginal portions in sealing engagement with marginal portions of said casing and having other portions thereof adapted to seat on said aforementioned annular seat member, a hollow metallic air inlet valve chamber secured to the diaphragm on its outer face and provided with conical walls, and with an air inlet aperture at the outer end thereof, means for connecting the interior of said valve chamber at all times with one of said tubular connections, an air inlet valve in said valve chamber having conical portions for engaging the walls of said chamber surrounding the air inlet aperture, and a physically operable part connected with said valve, whereby, when the air inlet valve is seated and the diaphragm unseated, the differential of fluid pressures on opposite faces of said diaphragm and valve chamber will react against said physically operable part in a direction to seat said diaphragm.

CALEB S. BRAGG.
VICTOR W. KLIESRATH.